Oct. 11, 1960
F. ECAL
2,955,877
PNEUMATIC DEVICE FOR THE TRANSPORT AND
SCATTERING OF POWDERED PRODUCTS
Filed Jan. 5, 1959
3 Sheets-Sheet 1
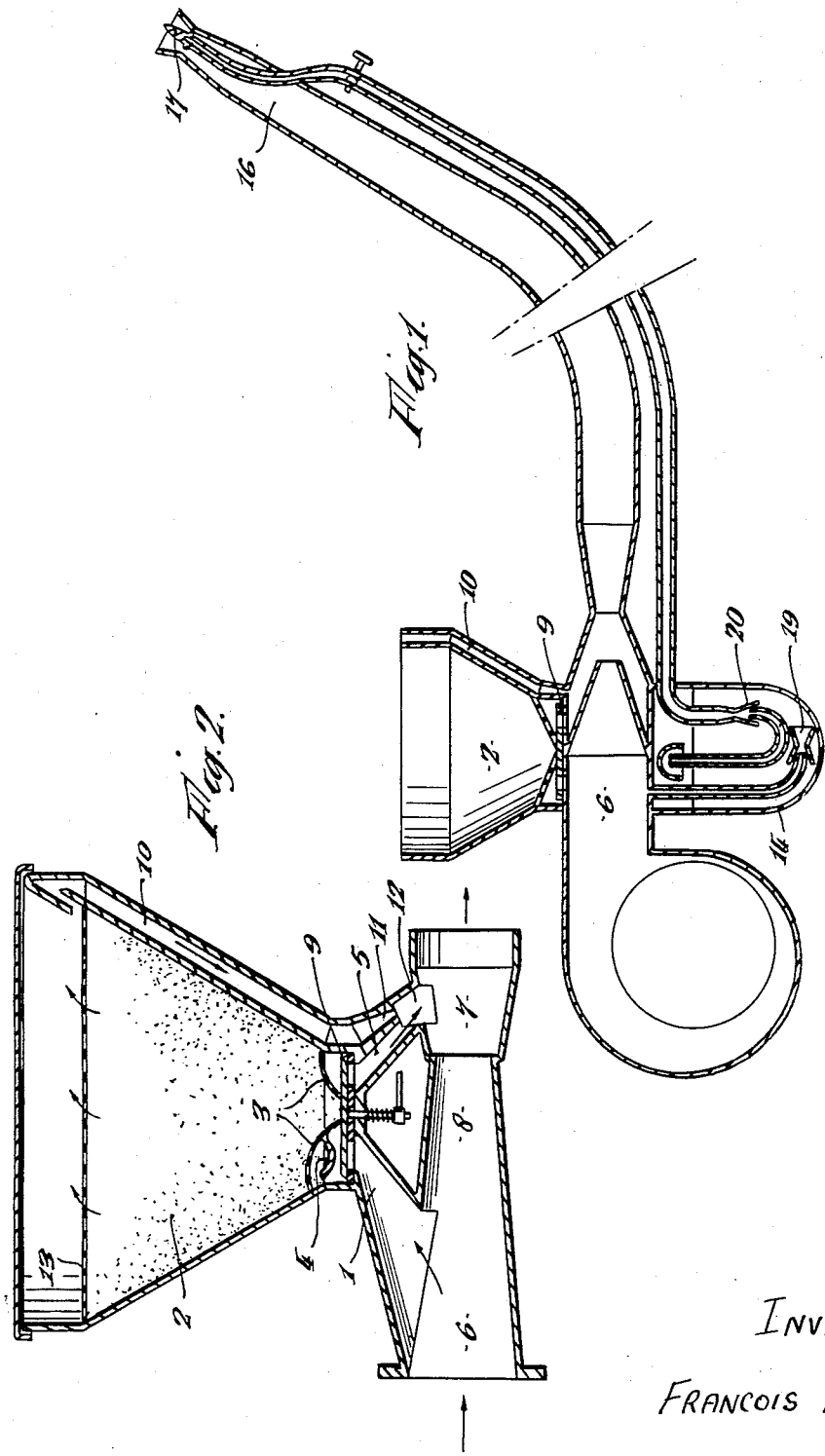
INVENTOR:
FRANCOIS ECAL Oct. 11, 1960

F. ECAL 2,955,877

PNEUMATIC DEVICE FOR THE TRANSPORT AND
SCATTERING OF POWDERED PRODUCTS

Filed Jan. 5, 1959

INVENTOR:-

FRANCOIS ECAL

INVENTOR:

FRANCOIS ECAL

2,955,877

PNEUMATIC DEVICE FOR THE TRANSPORT AND SCATTERING OF POWDERED PRODUCTS

François Ecal, 11 Rue Relin, Beziers, France

Filed Jan. 5, 1959, Ser. No. 784,977

9 Claims. (Cl. 302—20)

There are various known appliances for the distribution, the transport and the scattering of pulverized products, powdered products, liquid products, or powders mixed with liquids. These various appliances generally comprise a mechanical appliance for distributing powders or for the pulverization of liquids, which allow also of being driven beyond by a pneumatic device so as to be driven through pipes, or for forming, at the exit of the device, a shower of the product to be spread (the spreading of the powders and of the liquid pulverized products can be independent or concomitant, particularly as regards agricultural treatments).

Another known process, peculiar to the spreading of powders, consists in having the surface of the powder container licked or blown through from bottom to top, by a violent draught of air, so as to obtain from it the requisite quantity, which generally goes through the ventilation organ which is given the function of giving its energy to the motive fluid, which sometimes brings about the unbalancing of this organ.

Another known process consists of making all the motive air go through the base of the mass of powders.

Finally, there is the known device which allows of having the base of the powder container traversed by just a part of the air derived from the main transport circuit, so as to allow of making independent the two functions required from the air; the removal of a quantity of the product and the transport which determines the general range of the device.

The first known process, which uses mechanical means, has the main disadvantage of its complex construction and its fragility in use as a result of the movement of certain of its parts in the middle of products which are often abrasive when it is a question of powders; another drawback is its low yield due to the high pressures which are required for the pulverization of liquid products through fine nozzles.

The second known process, in which the motive air carries the powders from the top of the container causes, through the effect of gravity, a decantation towards the interior of the said container, especially when the powders are a mixture of products of different densities; hence the absence of homogeneity in the products which are conveyed outside the device.

The third known process, in which the entire motive air goes through the base of the container of the product, does not allow of proceeding independently with the regulating of the flow of the product and with the regulating of the range of the device; these two functions must be connected together.

The fourth known process does indeed have the advantage of individulizing these two functions and of consequently permitting their independent regulation; but the arrangements thereof present certain drawbacks which limit the use of the devices which apply it. In effect, the regulation of the flow of the powders is only obtained by the regulation of the arrival of the air obtained from the powder container so that, when it is a matter of powders which are particularly light or of very great fineness, the total stoppage of the flow of powders is difficult to obtain, for a certain flow is caused by the simple trepidations of the device, in the absence of air (secondary motive air).

On the other hand, in the case of the fourth process, if certain powders which only bind slightly, pass naturally, by simple gravity, towards the base of the powder container, to be removed by the draught of air which is sent into this part, this is not the same in the case of certain products which sink and thus cause an intermediate flow; this sinking is of particular importance in mobile appliances such as those provided for the scattering of agricultural products.

Furthermore, in the second, third and fourth known processes, the absence of the special part does not allow of the simultaneous scattering of the liquid products and pulverized products such as it is sometimes necessary to carry out in agriculture.

This invention aims at a device in which the distribution of the pulverized or liquid products, their conveyance in the pipes and their spreading in a pulverized form, are carried out in a manner which is essentially pneumatic and in a manner such that, as the decanting of the products is impossible and as the regulating of the flow of the products is independent of the regulation of the range of the appliance, this flow regulation is obtained up to being able to reach the complete stoppage of the flow of the appliance, without the motive device which makes the air move being stopped for that reason.

Another characteristic of the device as per the invention is the creation of a third air circuit, known as the circuit for stirring the products in the container, of which the object is to fluidify, in a constant manner, the mass of this reserve so as to allow of its regular movement towards its base, irrespective of their quality and their granulometry; this stirring circuit does not itself participate in the removal of the powders, but only in the stirring of the container's powders; it allows of the stirring, in a permanent manner, so as to avoid any sinking and this even when the appliance ceases to feed the product and that the ventilator continues to turn.

Finally, the invention allows of using a single and the same appliance, with the aid of a single ventilator fan (or other device which produces a draught of air), for the conveyance and spreading of liquid products and powdered products, be this in an alternate or concomitant manner. This result is obtained by the combination of special appliances which are situated in the container of liquid on the one hand and in the outlet orifice of the device, on the other, which devices cooperate in creating, at the level of the liquid, the pressure which is required for its transport through the appropriate pipes until the product reaches the device where its pulverization is obtained by the high speed of the air which prevails at this level. These parts contribute, furthermore, to ensuring the stirring of the liquid solutions to be scattered.

To be better able to understand the invention, an illustration—which is not limited—is described hereinunder and it is showning forms of construction as per the drawings herewith, which examples are also unlimited. In these drawings:

Fig. 1 is a vertical and longitudinal section of the assembly of the different parts of the device which cooperate in the transport and spreading, independent or concomitant, of powdered and liquid products.

Fig. 2 is a vertical and longitudinal section of the container of powders, on a larger scale, showing the different devices which ensure the regulating of the distribution of powder and the continuous stirring of the mass in the powder container.

Figure 3:
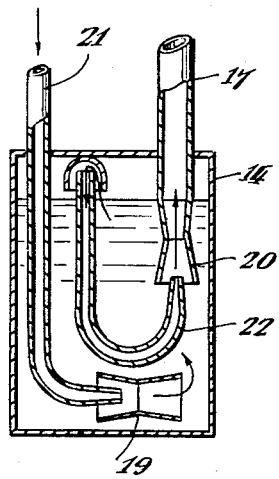
Figure 4:
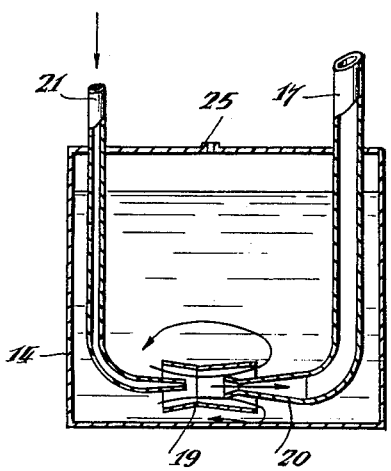

Figs. 3 and 4 are vertical diagrammatic sections, according to two different arrangements of the liquid container equipped with devices which ensure the pneumatic stirring of the liquid solutions in the container and the elevation of regulated quantities of liquid from outside the aforesaid container, in the event of this container having to be placed at a lower level than the exit outlet of the device.

Figure 5:
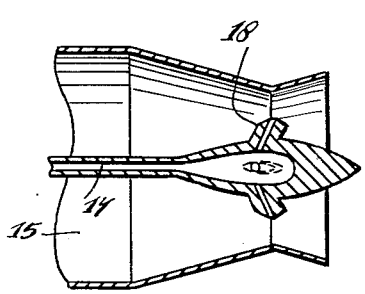
Figure 6:
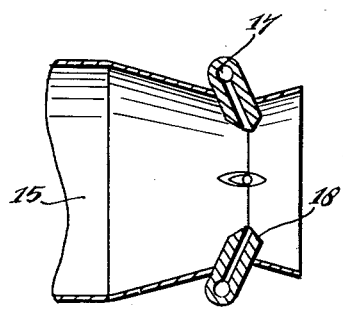
Figure 4:
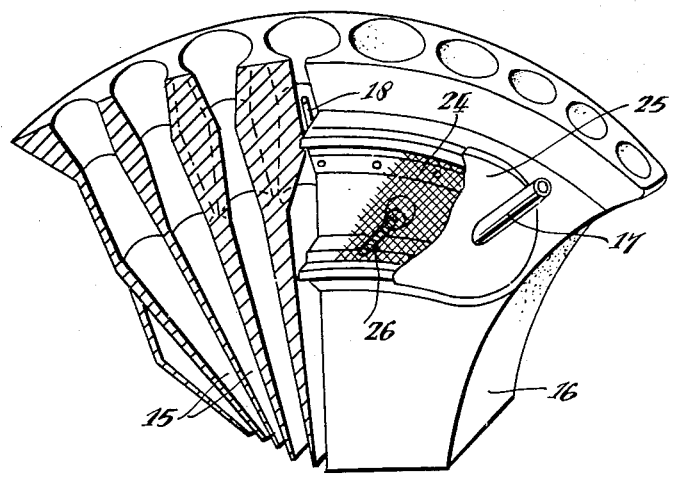

Figs. 5 and 6 are vertical and longitudinal diagrammatic sections, of two different layouts, of devices which ensure the pulverization of liquid products and, at the same time, their transport by depression up to this point of pulverization.

Figure 8:
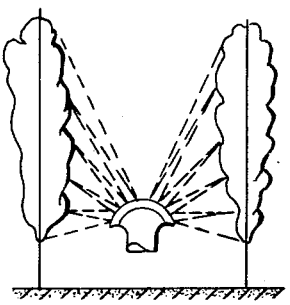

Fig. 7 is a sectioned view of a juxtaposition of several parts of which one is shown, isolatedly, in Fig. 5, in respect of works of pulverization which require a different range for each part, as shown in Fig. 8.

Figure 9:
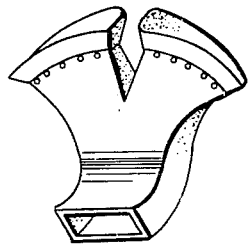

Fig. 9 shows a variant of Fig. 7.

One constructional method of the invention is described as follows:

The distributing device for the powder, which can operate either isolatedly or concurrently with others, comprises, essentially, a duct 1 (Fig. 2) in which the air or other gas, put into pressure by a preceding device such as a ventilator fan and driven at a great speed, partially goes through the base of the powder container 2, which is lodged in a hopper of a suitable shape to facilitate the driving of the said powders towards the aforesaid lower part; this can be equipped with a screen 3 consisting of two arched parts which leave, between them, a space which is filled with powder to be removed; this grill 3 can be completed by a deflector 4 which distributes the air and facilitates, for certain products, the penetration of the motive fluid into the lower part of the container.

The speed of the air in the duct 1 can be achieved, either by direct releasing of the pressurized air admitted into this duct, or by depression created at the level of the orifice 5 of the exit of the hopper 2 while the duct 1 is opened to the atmosphere or, finally, by the conjugation of these two processes, as shown in Fig. 2.

This conjugation, which creates a depression at the level of the duct 5 at the exit of the hopper, can consist of a duct 6 which forms the main transport circuit and of which the duct 1 is a derivation, which duct 6 opens out into a chamber 7 where the aforesaid duct 5 ends and in one or several "Venturi passages 8" or any other similar system for that purpose, being placed between 6 and 7.

It is therefore understood that to regulate the feed of the appliance, the hopper 2 being hermetically closed at its upper part, it would suffice to regulate the flow of air at the entry of the base of the container of the product, by means of a regulating device inserted in the duct 1, but it would be observed that certain pulverisable products, particularly fluid in themselves, could flow naturally through the exit duct 5, even in the absence of air feed in the base of the container, this regulating organ being completely closed.

That is why the invention provides for the inlet ducts 1 and the outlet ducts 5 being both regulated, simultaneously, by a same device 9, or by an assembly of coupled devices, in a manner such that the outlet of the duct 1 in the powder base and the exit of the duct 5 of this base, open and close simultaneously and proportionately to the flow of the powder as required, it being possible to be sure to obtain the total positive closure of the exit 5 with the assurance of being able to achieve the complete stoppage of the flow of the appliance.

Furthermore, the blocking shutter of the outlet of duct 1 into the base of the powders is organized in a manner such that, even in the totally closed position of the exit duct 5 (and therefore, the total stoppage of the flow of powders), this outlet of the duct 1 preserves a certain degree of opening which allows of the permanent entry of a certain quantity of air under pressure towards the entire contents of the hopper 2. In effect, without this special organization, the powders would be driven from the interior of the hopper 2 towards the base of the products from screens 3 by their sole gravity so that it would be noticed that certain products show a sinking effect and agglomeration effect, facilitated by the shaking or vibrations of the device, which effect causes, in those cases, an irregular flow of the device. That is why in the invention with two air circuits, the main transport 6—8—7 and the distribution shunt 1—3—9—5 have a third circuit added which ensures the constant scattering of the powders situated in the container in the hopper 2, so as to keep the mass in the container in the fluid state and therefore, to facilitate their regular and continuous fall towards the screen 3 and the base of the powders.

This third stirring circuit consists, essentially, in addition to the maintaining of a certain degree of opening of the outlet from conduit 1 towards the base of the powders, of a channel 10 which connects the upper section of the hopper 2 with the depression chamber 7 and terminating, on the level thereof, by a "Venturi passage 11" which ends up just at the extremity 12 of the outlet of duct 5.

It is then understood that (Fig. 2) whilst a part of the air passes into the main circuit of transport 6—8—7, another shunt part goes, at high speed, into the base of the powders between the two screens 3 and through these, whilst another equally shunted part and which is still under pressure, goes through the mass of the powders in the container, from bottom to top, for the purpose of aerating them and preventing their sinking; it then goes down again through the duct 10 and up to the Venturi passage 11 and to the confluent 12 with the duct 5; the speed of the air for stirring goes on, in a decreasing manner, towards the top of the hopper; this air escapes at the surface of the mass of powders in the container, at a very low speed, which avoids the driving of the product in an appreciable quantity towards the duct 10 which terminates the circuit of the stirring. This result can still be improved by the presence, at the top of the hopper 2, of a fine grill (or screen) 13.

It can be seen that the stirring circuit 4—2—13—10—11 is always kept open even when the duct 5 for the exit of the powders is completely blocked. The flow of the appliance being stopped, the stirring is continued, the outlet of the duct 1 near the deflector 4 always leaving a sufficient passage of compressed air towards the mass of powders in the tank (or container).

The three circuits—the main transport circuit 6—8—7, the shunt distribution circuit 1—3—9—5 and the shunt stirring circuit of the container 4—2—13—10—11—12 are different and ensure a fully pneumatic functioning, with a single driving device. The fact that the stirring circuit ends at the Venturi passage 11 near the exit of the distribution circuit 5 in the junction 12, keeps constant the speed of the air between the duct 1 and its exit 5 and therefore proportions the flow of powders to the opening surface of the device or recorder 9 for regulating the distribution of the powders. In effect, the air admitted at 5 tends, to cancel at this level, the depression which prevails in chamber 7, the more so as the flow is greater. The speed of the air between 1 and 5 would therefore tend to diminish, inversely to the opening of the device 9, of which the result would be to stabilize the flow of powders at a maximum which could not be exceeded, despite the increase in the opening of the device 9.

Due to the layout of the passage 11, the air which comes from the duct 10 contributes to the prevailing of a depression at the level of the outlet of the duct 5.

As the opening of the recorder 9 increases, the pressure in 5 would tend to increase, but the speed in 11 would thus increase and the depression at this level would increase in the same proportion and compensate, at the level of 5, the pressurization which would tend to prevail therein. It is thus possible to obtain, for any position of the device 9, a balancing flow between the pressure at 5 and the depression at 11, which has the result of keeping constant the air speed provided for between 1 and 5 and therefore, of proportioning the flow of powder in an exact manner at the opening surfaces of the device.

As regards the necessity, which is often found, for instance in the case of agricultural treatments, of producing, alternatively or simultaneously, with the same appliance, pulverizations of liquids and powders (damp powders), the invention provides for the adjunction, to the devices described above and which are specially designed for the powders, of pneumatic devices which are capable of stirring, conveying and pulverizing the liquid products, by purely pneumatic means and with a single motor device which is meant for the powders (Figs. 1, 3, 5, 6).

A device allows of the regular directing of the liquid contained in a container 14 up to the outlet orifice 15 of the device, despite the possible unlevellings between the aforesaid container and the aforesaid outlet; it also allows of stirring the liquid mixture contained in the reservoir 14, so as to maintain its homogeneity and to allow of the making of a very fine jet spray and which is very directed, so as to achieve a considerable wetting efficiency and a long range.

The device for the pulverization at the outlet (Fig. 5) comprises a sleeve 15 in the shape of a Venturi cone which is connected to the essential devices of the appliance by means of an exit duct 16. The liquid which comes from the container 14 goes into a duct 17 which ends in one or several pipes 18 which are arranged in the form of a star around its axis and empties into the duct 15 at the level of the passage of the Venturi cones, so as to give the vaporization effect due to the depression prevailing at this level of the vein of air, on the one hand, and at the speed thereof, on the other. Furthermore, the duct 17 ends at its extremity by a pointed arch of a shape such that the losses of load caused by the presence of a pointed arch above the passage are practically nil and also, that the flow of the air below is carried out without shaking. The pipes 18 are, for preference, careened in front and at the back in the direction of the axis of the sleeve 15. In addition, each of these pipes 18 comprises, at its extremity, at the careening level, two inverse inclined planes, in the direction of the vein of air, the one which is situated above making it possible for the air not to be braked by the careening and reaches the extremity of the nozzle 18 with its highest speed; the one which is situated below allows of the drops of liquid formed by the pulverization not being reagglomerated by the viscosity of the product along the rear careening and then, along the pointed arch.

These improvements ensure a greater division of the drops and a better aerodynamic yield of the system, thereby economizing the power required for a certain result and also increasing, with the same pressure of motive air, and in a considerable manner, the depression prevailing in 18, which allows of conveying the liquid up to this level, without mechanical devices such as pumps.

This result is also facilitated when the dislevelment between the container 14 and the outlet 15—17 is very great, by means of a device (Fig. 3), which is the combination of two emulsifiers 19 and 20 which are placed in series on the same air circuit and are contained in the container 14. The compressed air which is removed, by means of a duct 21, in derivation from the main transport duct 6, before the point where this air is filled there with powders, is, in the very first place, injected into the emulsifier 19 which is formed by one or several Venturi ducts which multiply the flow or create the emulsion; this air drives the liquid in a whirlwind movement through this device at the same time as it facilitates its expansion movement by the drive of the emulsified air towards the free surface of the liquid; the liquid is thus suitably stirred by a mounting whirlwind. The compressed air which escapes to the surface of the liquid within the container 14 which is hermetically closed, submits this to pressure and escapes by a duct 22 so as to be again injected into the second emulsifier in the Venturi passage 20 which forms the entry of the pipe 17 leading to the pulverization device 18. The emulsion thus created again increases the height at which the liquid could have been raised in the duct 17 by the simple fact of the pressure prevailing in the container.

Furthermore, it is noticed that the molecular division already created by this compressed air in emulsion in the liquid thus directed towards the pulverizer causes, at the level thereof, a much finer pulverization than if it were a question of homogeneous liquid. So that, with this part of the invention, it is possible to obtain simultaneously and in a purely pneumatic manner, the triple objective which is required, that is to say: stirring, elevation and fine pulverization of the liquid.

In the event of the container 14 holding a stable solution which does not require stirring, or in the case of a higher elevation being useless, it is possible to use a single emulsifier or similar system.

A variation (Fig. 4) requires a lower air pressure, but a greater air flow; the stirring circuits and emulsifying circuits in that case are parallel and not in series, in the container 14 of the liquid (parallel, horizontally or vertically or completely otherwise). A calibrated orifice 23 can then be made in an upper wall of the said container 14 so as to increase the flow of the stirring of the device 19 comprising two emulsifiers in parallel; this stirring can be carried out even during a stoppage period of the flow of the liquid, the duct 17 being closed.

A variation (Fig. 6) of the pulverization device at the exit of the liquid deals with the case where it would appear to be of greater advantage to bring the said liquid into the outlet orifice of the device by means of an annular duct 17 and not an axial one.

Another part of the invention deals with a juxtaposition of several pulverization devices; without in any way changing the individual characteristics of each device, it can be advantageous, to form a coating of pulverized powder or of liquid, with large angular opening, to juxtapose several of these parts, then forming a bundle, Fig. 7, for instance, in the shape of a fan; in this bundle, each device is of a size such that the power of the pulverized jet which it emits is the function of the range required in the considered direction; this juxtaposition is required, for certain pulverization works such as the one which consists in treating, simultaneously, raised and brought together suffices, which require considerable range differences according to the direction under consideration (Fig. 8). The various elements of the bundle, instead of being identical, can be different among themselves whilst being of the same system, so as to proportion the power of their jet to the range required in their own direction. Provision can be made, to facilitate the construction and the use, for all the pulverization nozzles 18 to be united in a same collecting box in which ends the single duct 17 for the arrival of the liquid; such a device facilitates the erection and allows of the mounting of a single screen 24 for filtering which is fixed, as well as a lid 25, by an ordinary device 26 (or device which is used for both).

A variation (Fig. 9) of the bundle allows for the replacement by an external casing, of the assembly of the parts which produce the various jets.

I claim:
1. A pneumatic conveying apparatus for finely-divided material, comprising a material container having a bottom opening and an air outlet adjacent its top, valve means disposed in said bottom opening and having two apertures and adjustable means for closing said apertures, a conveyor line including a tapered Venturi nozzle, a conduit connected between the conveyor line and the valve for passage of air under pressure from the conveyor line upstream of the venturi through one of said apertures into the material container, a conduit connected between the valve and a part of the conveyor line downstream of the Venturi nozzle for passage of air and material from the container through the other said aperture to the conveyor line, and a conduit connected between the air outlet of the container and a part of the conveyor line downstream of the Venturi nozzle for passage of air from the upper part of the container to the conveyor line.

2. A pneumatic conveying apparatus for finely-divided material, comprising a material container having a bottom opening and an air outlet adjacent its top, valve means disposed in said bottom opening and having two apertures and adjustable means for closing said apertures, a conveyor line including a convergent portion followed in the direction of flow by a wider portion to constitute a venturi, a first conduit connected between a point of the conveyor line, upstream of the venturi, and the valve for passage of air under pressure from the conveyor line through one of said apertures into the material container, a second conduit connected between the valve and a point of the conveyor line downstream of the venturi for passage of air and material from the container through the other said aperture to the conveyor line, and a third conduit connected between the air outlet of the container and a point of the conveyor line downstream of the venturi and adjacent to the outlet of the said second conduit, said third conduit terminating where it connects to the conveyor line in a tapering nozzle portion forming a venturi, whereby any reduction, of the lowered pressure caused by the conveyor line venturi at the outlet of the second conduit, due to increased flow through the first and second conduits when the two valve openings are opened, is offset by increased air flow through the venturi of the third conduit.

3. A pneumatic conveying apparatus for finely-divided material, comprising a material container having a bottom opening and an air outlet adjacent its top, an adjustable valve disposed in said bottom opening and having two apertures and a movable valve member arranged for simultaneous closing and opening of said two apertures, a first of said apertures being incompletely closed and the second of said apertures being completely closed in one end position of movement of the valve member, a conveyor line including a Venturi nozzle, a conduit connected between the conveyor line upstream of the Venturi nozzle and the valve for passage of air under pressure from the conveyor line through the first of said apertures into the material container, a conduit connected between the valve and a part of the conveyor line downstream of the Venturi nozzle for passage of air and material from the container through the other said aperture to the conveyor line, and a conduit connected between the air outlet of the container and a part of the conveyor line downstream of the Venturi nozzle for passage of air from the upper part of the container to the conveyor line.

4. A pneumatic conveying apparatus for finely-divided material, comprising a material container having a bottom opening and an air opening adjacent its top, a conveyor line including a Venturi nozzle, an adjustable valve disposed in said bottom opening and having two apertures and adjustable valve means for closing said two apertures, said apertures providing a communication between the material container and parts of the conveyor line respectively upstream and downstream of the Venturi nozzle, and a conduit communicating between the air outlet of the material container and a part of the conveyor line downstream of the Venturi nozzle.

5. A pneumatic conveying apparatus, as claimed in claim 4, wherein the conduit terminates in a Venturi nozzle where it opens into the conveyor line, the outlet of said nozzle being positioned adjacent the valve aperture downstream of the conveyor line venturi.

6. A pneumatic conveying and discharging apparatus for a mixture of finely-divided material and atomized liquid, comprising a conveyor line including a first Venturi nozzle intermediate its ends and a second Venturi nozzle at its outlet end, means for forcing air under pressure through said conveyor line, a container for finely divided material having a bottom opening and an air opening adjacent its top, an adjustable valve disposed in said bottom opening and included in the wall of the conveyor line, said valve having two apertures providing a communication between the material container and parts of the conveyor line respectively upstream and downstream of the first Venturi nozzle, said valve including adjustable valve means arranged for closing of the two apertures, a conduit communicating between the air outlet of the material container and a part of the conveyor line downstream of the first Venturi nozzle, a tank for liquid, a pipe providing a communication between the conveyor line upstream of the first Venturi nozzle and the lower part of the tank, and an outlet tube opening at one end in the tank below a liquid level therein and opening at its other end at the constriction of the second Venturi nozzle of the conveyor line.

7. An apparatus, as claimed in claim 6, including a first Venturi duct in the tank and positioned coaxially about the outlet end of the pipe, a second Venturi duct at the inlet end of the tube within the tank, and a second pipe disposed within the tank and having one end opening at the upper part of said tank above the liquid level and the other end disposed coaxially within the second Venturi duct.

8. An apparatus, as claimed in claim 6, including a first Venturi duct positioned with one end coaxially about the outlet end of the pipe, and a second Venturi duct formed at the inlet end of the tube and positioned coaxially within the other end of the first Venturi duct.

9. An apparatus, as claimed in claim 6, including a discharge device mounted at the outlet end of the conveyor line and in which are formed a plurality of Venturi nozzles collectively constituting the second Venturi nozzle of the conveyor line, and a distribution chamber carried by the discharge device and having thereon a plurality of jects opening coaxially into each of the plurality of Venturi nozzles, said distribution chamber being connected to the outlet tube.

References Cited in the file of this patent

UNITED STATES PATENTS

| | | |
|---|---|---|
| 2,565,835 | Adams | Aug. 28, 1951 |
| 2,734,782 | Galle | Feb. 14, 1956 |

FOREIGN PATENTS

| | | |
|---|---|---|
| 330,652 | Germany | June 14, 1917 |
| 751,162 | Great Britain | June 27, 1956 |